United States Patent
Heim

[19]

[11] Patent Number: 5,992,266
[45] Date of Patent: *Nov. 30, 1999

[54] CLIPLESS BICYCLE PEDAL

[75] Inventor: Jonathan R. Heim, 61 Clarendon, Pacifica, Calif. 94044

[73] Assignee: Jonathan R. Heim, Pacifica, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/792,698

[22] Filed: Jan. 29, 1997

Related U.S. Application Data

[63] Continuation-in-part of application No. 08/710,710, Sep. 20, 1996, abandoned
[60] Provisional application No. 60/025,046, Sep. 3, 1996.

[51] Int. Cl.$^6$ ..................................................... G05G 1/14
[52] U.S. Cl. ..................... 74/594.6; 74/594.4; D12/125
[58] Field of Search .............................. 74/594.1–594.6; D12/125; 36/131, 132

[56] References Cited

U.S. PATENT DOCUMENTS

| | | |
|---|---|---|
| Re. 30,758 | 10/1981 | Lang . |
| D. 262,873 | 2/1982 | Okajima . |
| D. 280,192 | 8/1985 | Watanabe . |
| D. 284,459 | 7/1986 | Shimizu . |
| D. 324,838 | 3/1992 | Briscadieu . |
| D. 387,706 | 12/1997 | Hanamura ............................ D12/125 |
| 3,701,291 | 10/1972 | Baginski .............................. 74/594.4 |
| 3,800,623 | 4/1974 | Baginski .............................. 74/594.4 |
| 3,807,255 | 4/1974 | Baginski .............................. 74/594.4 |
| 3,811,339 | 5/1974 | Konzorr ............................... 74/594.4 |
| 4,171,824 | 10/1979 | Foster ............................. 74/594.6 X |
| 4,269,084 | 5/1981 | Okajima . |
| 4,302,987 | 12/1981 | Takeda . |
| 4,313,352 | 2/1982 | Okajima . |
| 4,335,628 | 6/1982 | Shimano . |
| 4,381,683 | 5/1983 | Takeda . |
| 4,386,472 | 6/1983 | Shimano . |
| 4,411,169 | 10/1983 | Takeda . |
| 4,442,732 | 4/1984 | Okajima . |
| 4,445,397 | 5/1984 | Shimano . |
| 4,523,492 | 6/1985 | Shimano . |
| 4,526,059 | 7/1985 | Takeda . |
| 4,569,249 | 2/1986 | Shimano . |
| 4,622,863 | 11/1986 | Denker ................................ 74/594.6 |
| 4,630,503 | 12/1986 | Liu . |
| 4,700,588 | 10/1987 | Nagano . |
| 4,787,266 | 11/1988 | Romano . |
| 4,827,633 | 5/1989 | Feldstein ......................... 74/594.6 X |
| 4,838,115 | 6/1989 | Nagano . |
| 4,840,085 | 6/1989 | Nagano . |
| 4,856,996 | 8/1989 | Henson . |
| 4,873,890 | 10/1989 | Nagano . |
| 4,882,946 | 11/1989 | Beyl . |
| 4,899,618 | 2/1990 | Christol ............................. 74/594.6 |
| 4,928,549 | 5/1990 | Nagano .............................. 74/594.6 |
| 4,942,778 | 7/1990 | Bryne ................................. 74/594.6 |
| 4,969,373 | 11/1990 | Good . |
| 5,003,841 | 4/1991 | Nagano .............................. 74/594.4 |
| 5,048,369 | 9/1991 | Chen .................................. 74/594.6 |
| 5,060,537 | 10/1991 | Nagano .............................. 74/594.4 |

(List continued on next page.)

FOREIGN PATENT DOCUMENTS

| | | |
|---|---|---|
| 0 393 586 A1 | 10/1990 | European Pat. Off. . |
| 0516013 A2 | 12/1992 | European Pat. Off. ............. 74/594.6 |
| 0619219 A1 | 10/1994 | European Pat. Off. ............. 74/594.6 |
| 0 826 589 A1 | 3/1998 | European Pat. Off. . |
| 4-215584 | 8/1992 | Japan ................................. 74/594.6 |
| 4-372486 | 12/1992 | Japan ................................. 74/594.6 |

*Primary Examiner*—Vinh T. Luong
*Attorney, Agent, or Firm*—Morrison & Foerster LLp

[57] ABSTRACT

A clipless pedal system for bicycles includes a pedal platform and two cleat retainers. The cleat retainers have hooked ends and are held against opposite sides of the pedal platform. A resilient loop encircles the pedal platform, holding the cleat retainers against the pedal platform. The ends of the cleat retainer may pivot away from the pedal platform by elastic deformation of the loop, allowing insertion of a cleat attached to a cycling shoe.

28 Claims, 17 Drawing Sheets

U.S. PATENT DOCUMENTS

| | | | |
|---|---|---|---|
| 5,081,883 | 1/1992 | Romano | 74/594.6 |
| 5,097,687 | 3/1992 | Turrin et al. | |
| 5,115,692 | 5/1992 | Nagano | 74/594.4 |
| 5,142,938 | 9/1992 | Sampson | 74/594.6 |
| 5,159,853 | 11/1992 | Gibson | 74/594.6 |
| 5,195,397 | 3/1993 | Nagano | 74/594.4 |
| 5,199,324 | 4/1993 | Sain . | |
| 5,203,229 | 4/1993 | Chen | 74/594.6 |
| 5,203,827 | 4/1993 | Nestrud . | |
| 5,251,508 | 10/1993 | Robbins | 74/594.4 X |
| 5,259,270 | 11/1993 | Lin | 74/594.6 |
| 5,279,184 | 1/1994 | Ogino | 74/594.6 |
| 5,361,649 | 11/1994 | Slocum, Jr. . | |
| 5,379,665 | 1/1995 | Nagano . | |
| 5,505,111 | 4/1996 | Nagano | 74/594.6 |
| 5,546,829 | 8/1996 | Bryne | 74/594.6 |
| 5,553,515 | 9/1996 | Yang et al. | 74/594.3 |
| 5,662,006 | 9/1997 | Angeltun | 74/594.4 |
| 5,697,262 | 12/1997 | Chen | 74/594.6 |

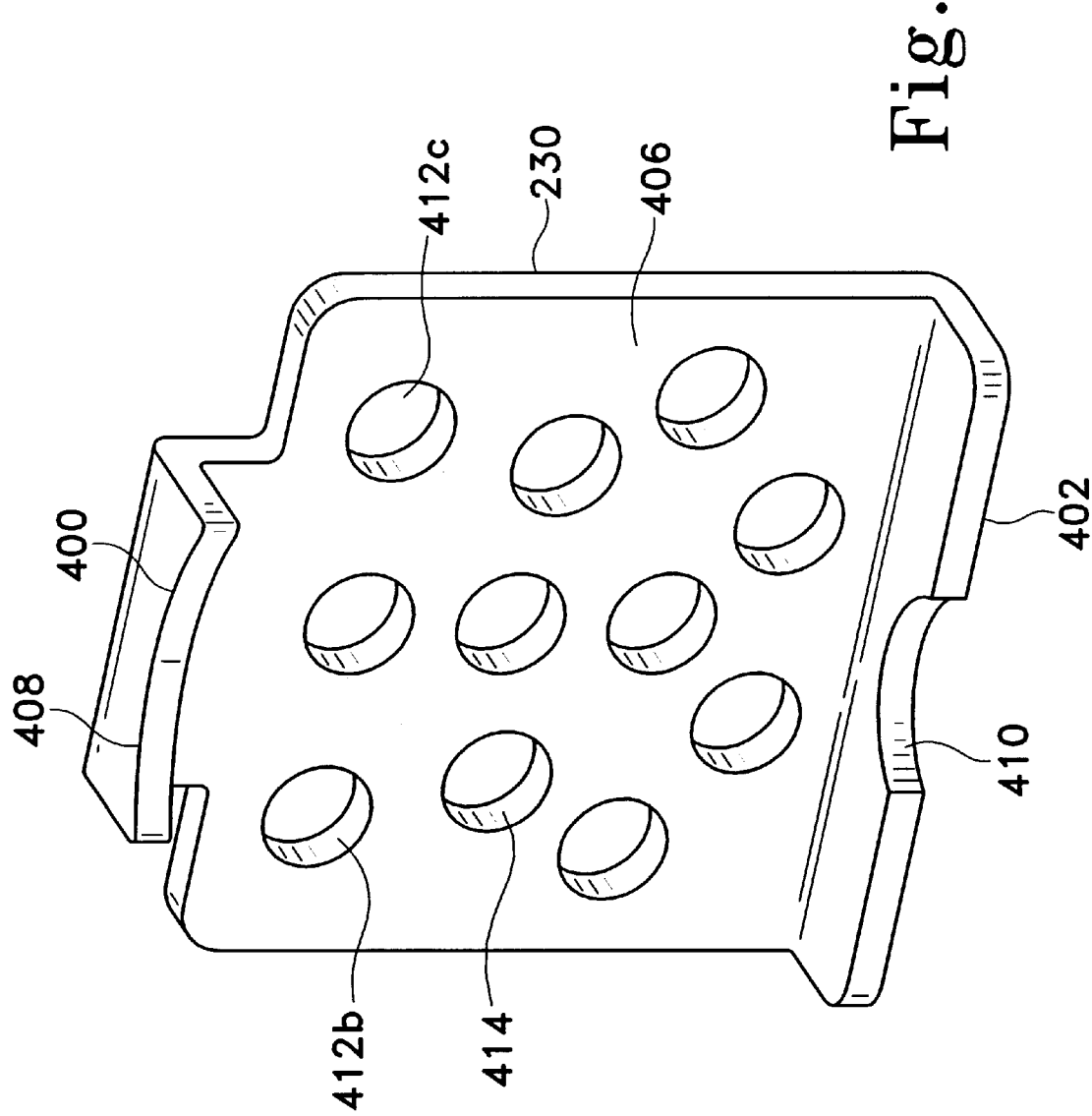

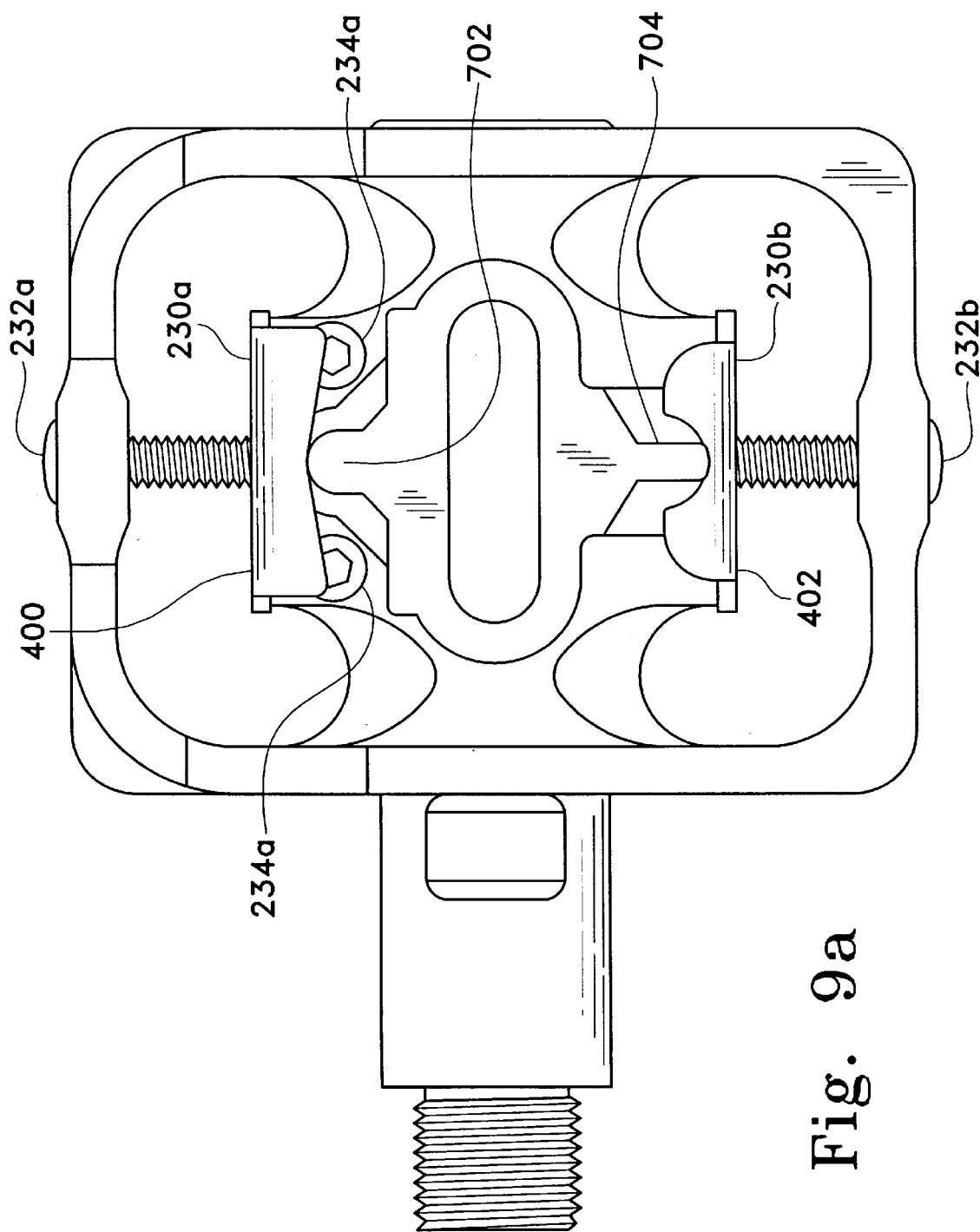

CLIPLESS BICYCLE PEDAL

CROSS-REFERENCE TO RELATED APPLICATIONS

The following application is a continuation-in-part of U.S. application Ser. No. 08/710,710 entitled "Clipless Bicycle Pedal" by Jonathan R. Heim, filed Sep. 20, 1996, now abandoned which application is based on Provisional Application Ser. No. 60/025,046 entitled "Improved Simplified Clip-In Bicycle Pedal with Twist-Out Release" by Jonathan R. Heim, filed Sep. 3, 1996, the disclosure of each is incorporated herein by reference.

TECHNICAL FIELD

The present invention relates generally to bicycle pedal systems. More specifically, the present invention is a simplified clipless pedal system including a pedal assembly and a cleat for attaching the sole of a cycling shoe to a bicycle.

BACKGROUND ART

Traditionally, more serious cyclists have used a system where a specialized, cleated cycling shoe is secured to a complementary pedal using a strap, or toe-clip. Using this system, the cyclist starts riding and then tightens the strap, or toe-clip. Stopping required that the rider first loosen the strap, allowing the shoe, and the cyclist's feet, to be disengaged from the pedal. This system had the advantages of being simple, light and effective when used by experienced cyclists in appropriate conditions.

Unfortunately, the use of toe-clips also had a number of serious disadvantages. Most serious of these was the inability of the rider to disengage his feet from the pedals in case of an unexpected or emergency stop. This became especially serious with the increase in popularity of mountain bikes. Mountain bikes are most often used in off-road conditions. This type of riding is often far less predictable than more traditional cycling. As a result, unexpected or emergency stops are far more common and the riders of mountain bikes have a much greater need to be able to rapidly separate themselves from their bicycles.

The need for better bicycle pedal systems lead to the development of a number of different clipless pedal systems. These pedal systems include cleats which are affixed to the bottom of cycling shoes. The pedal includes a binding system which locks to the cleat to hold the shoe and the pedal together. The rider releases the cleat from the binding system by twisting the cleat in the pedal. Thus, the clipless pedal provides the rider with a secure connection to the pedal, and still allows the rider to rapidly disengage in the event of an unexpected stop.

Not surprisingly, clipless pedals have become increasing popular and, to a large extent, have actually replaced other pedal types. However, there are a few disadvantages associated with current clipless pedal designs. One disadvantage is complexity. Generally, the binding systems included in most clipless pedal designs include a number of moving parts. The bearings which support the pedal on the axle, or spindle, include still more moving parts. Many clipless pedals also include a number of different non-moving parts. These include, for example guides which help establish the position of the cleat within the binding system. The overall result is that a single pedal may include a large number of parts, increasing the manufacturing cost of each pedal. Worse, for many current clipless designs, the number of different parts is increased further by the requirement that the same part be provided in two mirrored versions, one for the right pedal and one for the left pedal, once again increasing manufacturing costs. The complexity of many clipless designs may also lead to a decrease in pedal durability. This is particularly true for mountain bike pedals whose components are required to function in dirt filled and otherwise hostile environments.

A second disadvantage of current clipless designs is weight. Generally, the binding system of most clipless pedals functions as a type of clamp. To be effective, the clamp must be supported by a rigid pedal platform. At the same time, the entire pedal assembly must be relatively small. The result has been that most clipless pedals have been constructed primarily from metals of various types making clipless pedal designs somewhat heavier than comparable toe-clip designs. In the weight conscious world of cycling, however, it is always desirable to find methods for making each component as light as possible.

A third disadvantage concerns rotation of the rider's shoe relative to the pedal. Traditionally, in toe-clip pedal systems, the rider's shoe is allowed a certain degree of unrestrained rotation with respect to the pedal. This unrestrained rotation is commonly known as "float" and generally results from the rather imprecise connection between the rider's shoe and the pedal provided by most toe-clip designs. The more precise connection provided by early clipless designs largely eliminated float, resulting in a number of complaints from riders who found that they preferred pedal systems which provide at least some degree of float.

The response has been to add some degree of float to clipless pedal designs. This has been accomplished by providing specialized cleats or by changing the basic cleat design to allow for rotation of the cleat within the binding system. Generally, however, it has been found that different riders prefer differing degrees of float. To accommodate these differences in preference, manufactures have offered a selection of different cleats. Unfortunately, the cleat is an expensive part of the pedal system and this cost tends to prevent many cyclists from purchasing the range of cleats offered by manufactures. As a result, cyclists are discouraged from experimenting with a range of cleats to find the degree of float that best suits their particular style of riding.

DISCLOSURE OF THE INVENTION

The present invention is a simplified, highly-integrated and lightweight clipless pedal system for bicycles. Structurally, the pedal assembly of the present invention includes a unitary structure formed as a pedal platform shaped as a substantially rectangular solid and band which surrounds the pedal platform. Preferably, the pedal platform and band are formed from a plastic material and have an upper surface and a lower surface. Between the upper and lower surfaces, the rectangular shape of the pedal platform has four sides, with two sides being major sides and two sides being minor sides.

The band of the pedal structure has a substantially rectangular solid shape and encircles a similarly shaped inner opening. Between the upper and lower surfaces, the band has four outer sides with two sides being major sides and two sides being minor sides. The band also has four inner sides with two sides being major sides and two sides being minor sides.

The pedal platform and band are disposed in a concentric arrangement with the platform positioned inside of the inner opening of the band. The band is dimensioned so that the size of the inner opening exceeds the size of pedal platform, leaving a gap between each side of the pedal platform and each inner side of the band. This gap is spanned, or siameased, by two webbings which connect each major side of the pedal platform with an inner major side of the band.

The pedal assembly also includes a first cleat retainer and a second cleat retainer. Each cleat retainer is formed to have an elongated U-shape with a flat central portion and two bent, or hooked, ends. Each flat portion is formed with a pivot hole. Each cleat retainer is positioned with its flat portion against one of the minor sides of the pedal platform and with its two hooked ends projecting above opposite surfaces of the pedal platform. Additionally, the cleat retainers are oriented so that the hooked ends of the cleat retainers face each other. Thus, two facing hooked cleat retainer ends project from each surface of the pedal platform.

Two set screws are included in the pedal assembly. Each set screw is formed to have a proximal threaded portion that abruptly narrows to a distal projection. A shoulder is formed at the transition between the proximal threaded portion and the distal projection of each set screw.

Each minor side of the band is formed with a threaded hole. One set screw is threadably inserted through each of these holes. The set screws are adjusted so that the distal projections pass through the pivot holes in the cleat retainers. When correctly adjusted, the shoulder of each set screw urges against the central portion of one of the cleat retainers, each set screw thereby serving as a stop. The cooperation between the pedal platform, cleat retainers, band and set screws allows each hooked end of each cleat retainer to be pushed outwardly from the minor side of the pedal platform by elastically deforming the band. Thus, the two hooked ends which project above each surface of the pedal platform form a clamp. The clamp may be opened by pushing the ends of the cleat retainers away from the pedal platform. Once opened, however, the elastically deformed band applies pressure to each set screw which, in turn apply pressure to each cleat retainer, pushing the ends of the cleat retainer back towards the pedal body. The clamp may be used to grasp a specially adapted cleat, such as a Shimano SPD type cleat.

In one embodiment of the pedal, cooperation between pedal platform, cleat retainers, band and set screws allow each cleat retainer to pivot a certain amount about an axis defined by the set screws. The pivoting of the cleat retainers allows the hooked ends of each cleat retainer to move laterally with respect to the pedal platform. The lateral movement of the hooked ends allows a cleat that is inserted into the clamp to pivot, or float. In another embodiment of the pedal, an amount of float is provided by fixed cylindrical members interfacing with the cleat retainers.

In each embodiment, the peg-like structures (the screws of one embodiment and cylindrical members in the other) interfere with unconstrained movement of the cleat retainers thereby setting the amount of float provided. Naturally, the present invention may use any means which controls the location of cleat retainers relative to the pedal platform in a manner equivalent to the pegs.

An axle is included in the pedal assembly and is preferable formed from a lightweight alloy and treated to have a hard, wear resistant surface. The axle has a threaded inboard end and an outboard end adapted to include a circlip or other retaining means. The outboard end of the axle passes through a bore through the major sides of the band and pedal platform. The retaining means is then affixed to the outboard end, retaining the pedal platform and band on the axle. In a preferred embodiment, the plastic material of the band and pedal platform is impregnated with a lubricant allowing the axle to turn in the bore without the need for bearings. Alternatively, the bearings may be included in the bore in at least some embodiments.

Objects and advantages of the invention will be set forth, in part, in the description which follows and, in part, will be understood by those skilled in the art from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention. FIGS. 1a, 2a, 3a, 4a, 5–7, 8a, 8b, 9a, 9b and 9c show a first embodiment; FIGS. 1b, 2b, 3b and 4b show a second embodiment of the invention.

FIG. 1a is an isometric view of a pedal and cleat of the present invention.

FIG. 1b is an isometric view of another cleat retainer of the present invention.

FIG. 2a is a top plan view of a pedal of the present invention.

FIG. 2b is an isometric view of another cleat retainer of the present invention.

FIG. 3a is a sectional view of a pedal of the present invention with the section taken along the line 3—3 of FIG. 1a.

FIG. 3b is an isometric view of another cleat retainer of the present invention.

FIG. 4a is an isometric view of a cleat retainer of the present invention.

FIG. 4b is an isometric view of another cleat retainer of the present invention.

FIG. 5 is an isometric view of the set screw of the present invention.

FIG. 6 is a sectional view of the pedal of the present invention, as seen in FIG. 3, with the cleat retainer shown pivoted away from the pedal platform.

FIG. 7 is a sectional view of the pedal of the present invention, as seen in FIG. 3, with a cleat shown operatively engaged with the cleat retainers and pedal platform.

FIGS. 8a is an isometric view of the pedal of the present invention with the cleat retainer shown pivoted in a first direction around the set screw of the present invention.

FIGS. 8b is an isometric view of the pedal of the present invention, as shown in FIG. 8a, with the cleat retainer now shown pivoted in an opposite direction around the set screw of the present invention.

FIG. 9a is a top view of the pedal of the present invention with a cleat shown operatively engaged with the cleat retainers and pedal platform.

FIG. 9b is a top view of the pedal of the present invention, as shown in FIG. 9a, with the cleat now shown to be rotated in a first direction.

FIG. 9b is a top view of the pedal of the present invention, as shown in FIG. 9b, with the cleat now shown to be rotated in an opposite direction.

FIG. 10 is a sectional view of the pedal of the present invention with the section taken along the line 10—10 of FIG. 1a.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

A number of basic preferred embodiments are shown in FIGS. 1–10. It is emphasized that each of these embodiments have structural features which may be interchanged and be comprised of different materials consistent with their function.

Figure 1A:
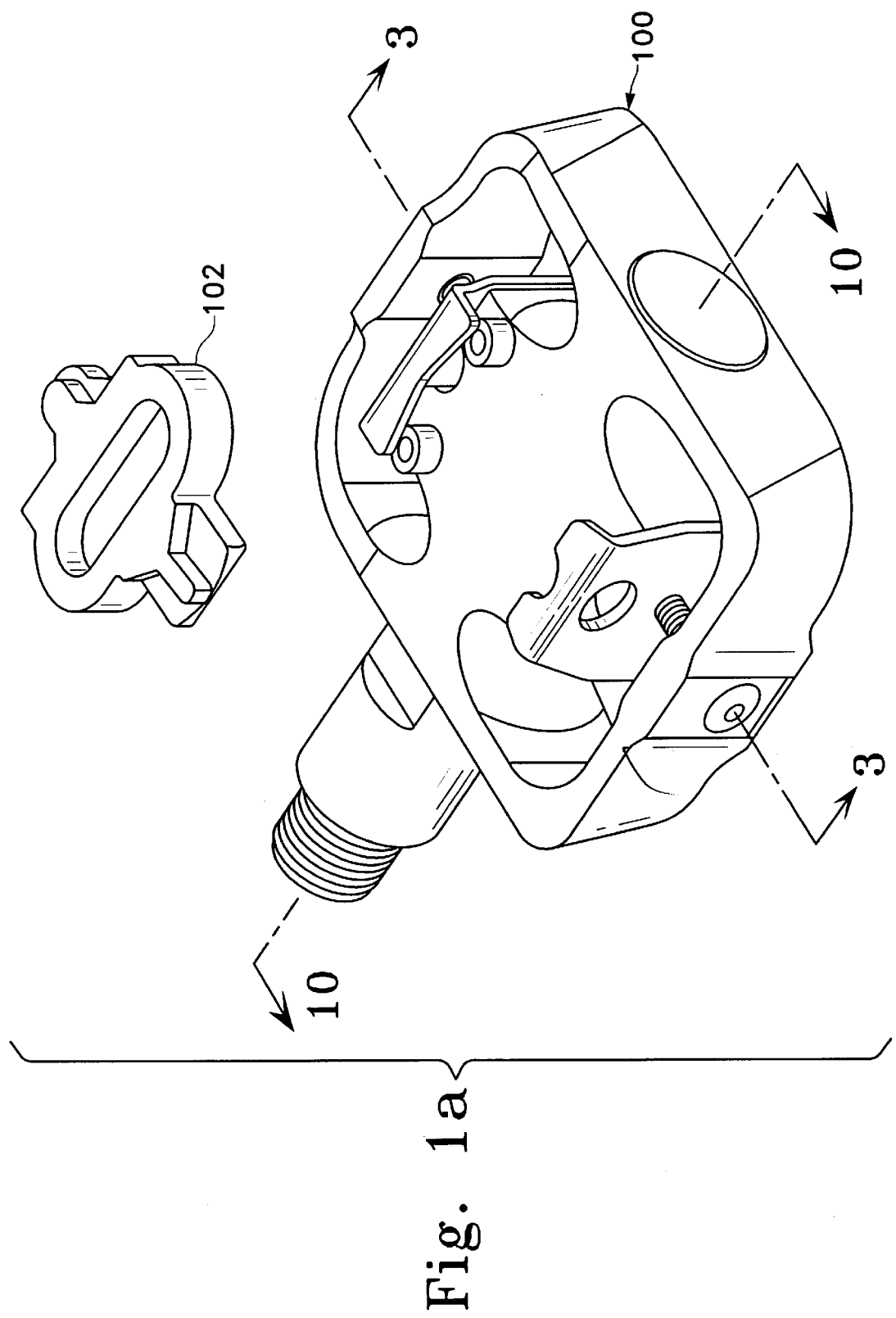
Figure 1B:
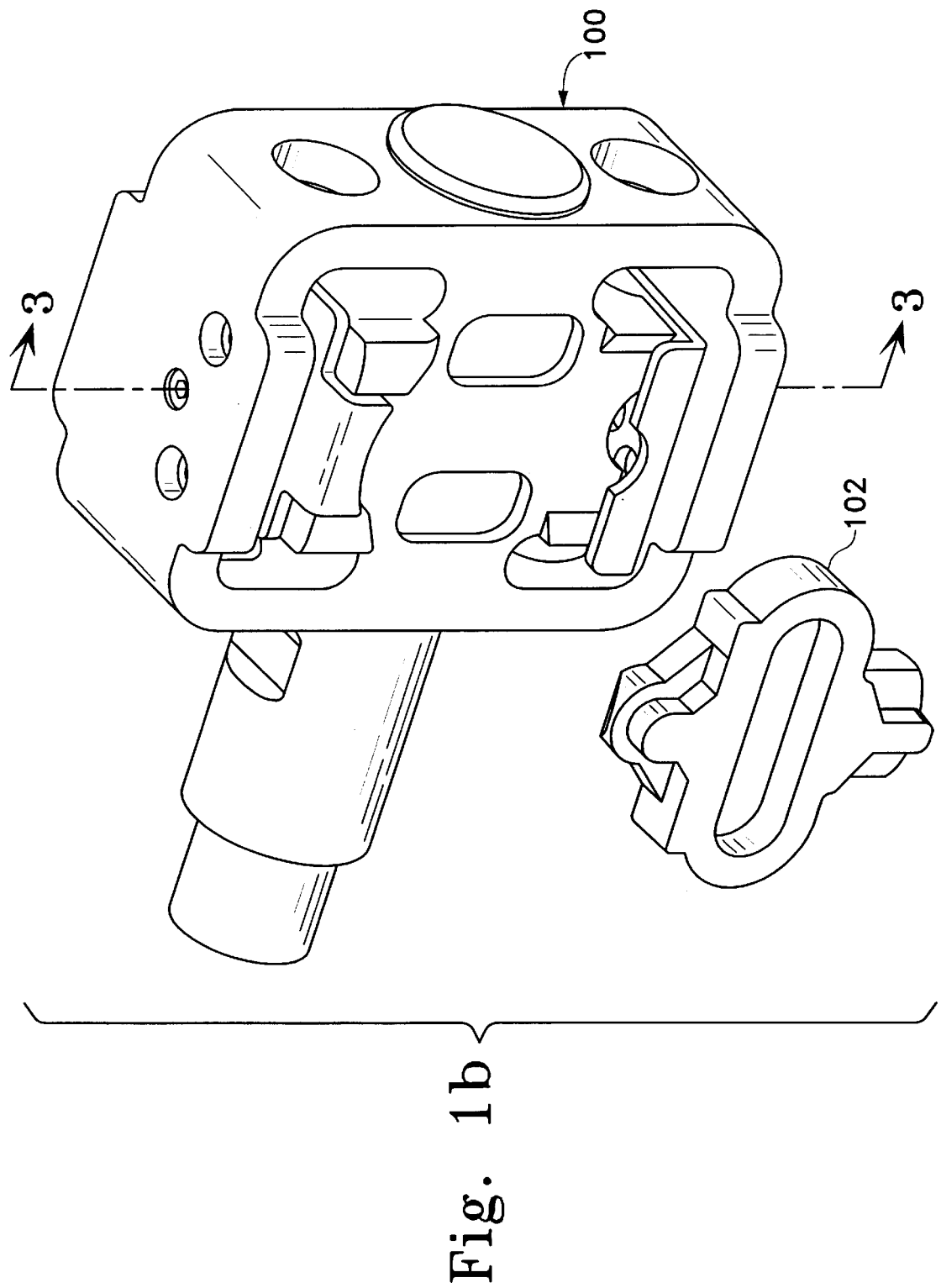

The present invention is a clipless pedal system for bicycles. Referring initially to FIGS. 1a and 1b, it may be seen that the present invention includes a pedal assembly 100 useable in combination with a cleat assembly 102. In more detail, and as better seen in FIGS. 2a, 2b and 3a, 3b, it may be seen that pedal assembly 100 includes a unitary structure formed as a pedal platform 200 surrounded by a band 202. Pedal platform 200 is formed as a substantially rectangular solid having an upper surface 204 and a lower surface 206, where "upper" and "lower" are used for ease of reference only. Between the upper surface 204 and lower surface 206, the pedal platform 200 has four sides with two sides being major sides 208a and 208b and two sides being minor sides 210a and 210b. The upper surface 204 and lower surface 206 are preferably formed with scallops 212a and 212b, or other similar recesses for the purpose of debris clearance. Similarly, the minor sides 210a and 210b of the pedal platform 200 may be formed with one or more scallops, also for the purpose of debris clearance.

The band 202 has a substantially rectangular solid shape and encircles a similarly shaped inner opening 214. Like the pedal platform 100, the band 202 has an upper surface 216 and a lower surface 218. Between the upper surface 216 and lower surface 218, the band has four outer sides with two sides being major sides 220a and 220b and two sides being minor sides 222a and 222b. The band also has four inner sides with two sides being major sides 224a and 224b and two sides being minor sides 226a and 226b.

The pedal platform 200 and band 202 are disposed in a concentric arrangement with the platform 200 positioned inside of the inner opening 214 of the band 202. The band 202 is dimensioned so that the size of the inner opening 216 exceeds the size of pedal platform, leaving a gap between each side 208 and 210 of the pedal platform 200 and each inner side 224 and 226 of the band 202. This gap is spanned, or siameased, by two webbings 228a and 228b which connect each major side 208 of the pedal platform 200 with an inner major side 224 of the band 202. Preferably, pedal platform 200 and band 202 are fabricated as a single piece of a resilient plastic material such as nylon. Alternately, band 202 and pedal platform 200 may be formed as individual structures and joined using appropriate methodologies.

The pedal assembly also includes a first cleat retainer 230a and a second cleat retainer 230b. Cleat retainer 230 of the pedal in 1a is shown more clearly in FIG. 4a where it may be seen that each cleat retainer 230 includes two hooked ends, which are, more specifically, a forward end 400 and a rearward end 402. Between forward end 400 and rearward end 402, each cleat retainer 230 has a flat central portion 406. In the case where Shimano SPD type cleats are to be used, forward end 400 includes a notch 408. Similarly, for SPD usage, rearward end 402 includes a notch 410. Each cleat retainer 230 is formed with a pivot hole 412. Pivot hole 412a is preferably positioned centrally within central position 406 midway between forward end 400 and rearward end 402. Optionally, a series of additional holes 414 are included for debris clearance and weight reduction.

The pedal assembly of 1b also includes a first cleat retainer 230c and a second cleat retainer 230d. As similarly with FIG. 4a, cleat retainers 230c and 230d are shown more clearly in FIG. 4b, where it may be seen that each cleat retainer 230 includes two hooked ends which are, more specifically, a forward end 400 and a rearward end 402. Between forward end 400 and rearward end 402, each cleat retainer 230 has a flat central portion 406. Where Shimano SPD type cleats are to be used, forward end 400 includes a notch 408, and rearward end includes a notch 410. Each cleat retainer 230 of the pedal in 1b includes at least two through-holes 412b and 412c through which pegs 234e and 234f pass. As with the pedal of 1a, a series of additional holes 414 may be included for debris clearance and weight reduction.

Referring again to FIGS. 2a and 3a, it may be seen that each cleat retainer 230 is positioned with its flat portion 406 against one of the minor sides 210 of the pedal platform 200. In this position, two hooked ends 400 and 402 project above opposite surfaces 204 and 206 of the pedal platform. The cleat retainers 230 are oriented so that the forward end 400 of the first cleat retainer 230a faces the rearward end 402 of the second cleat retainer 230b. Likewise, the rearward end 402 of the first cleat retainer 230a faces the forward end 400 of the second cleat retainer 230b.

The present invention also includes set screws 232a, 232b and 232c, 232d forming a point of contact with cleat retainers 230 and serving as a stop positioned between the band 202 and cleat retainers 230. Set screws 232c and 232d abut cleat retainers 230 in the pedal of FIG. 1b.

Figure 5:
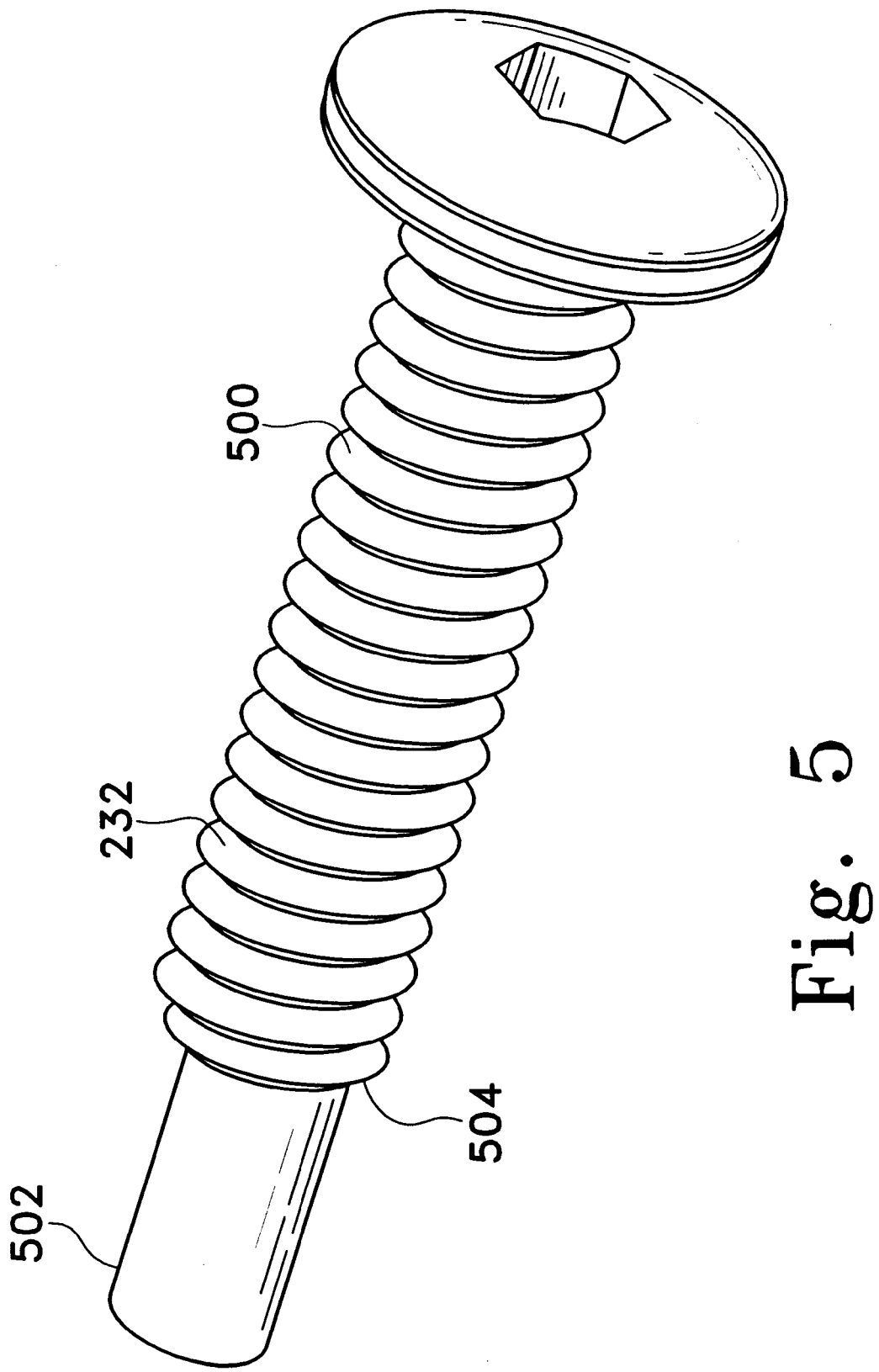

Set screws 232a and 232b of the pedal in FIG. 1a 232 are shown more clearly in FIG. 5 as having a proximal threaded portion 500 that abruptly narrows to a distal projection 502. A shoulder 504 is formed at the transition between the proximal threaded portion 500 and the distal projection 502 of each set screw 232.

Each set screw 232a and 232b passes through a threaded bore in one of the minor sides 222 of the band 202 to position shoulder 504 against the flat portion 406 of one of the cleat retainers 230. Set screws 232 are threadably adjusted to pretension band 202 to hold the cleat retainers 230 against the pedal platform 200. The distal projection 502 of each set screw 232 passes through the pivot hole 412a formed in the central portion 406 of one of the cleat retainers 230 and projects into a bore formed in one of the minor sides 210 of the pedal platform 200.

Figure 2A:
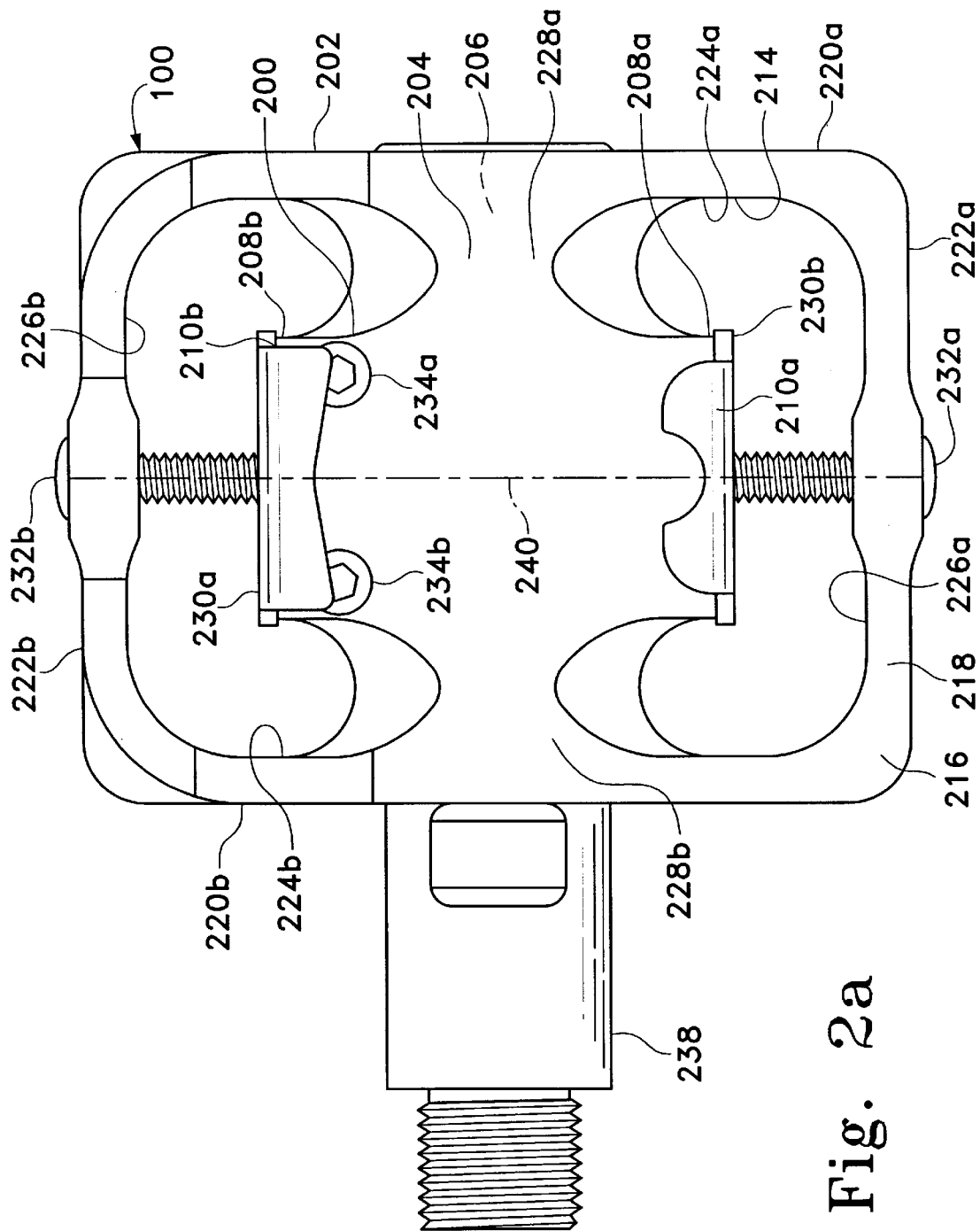
Figure 3A:
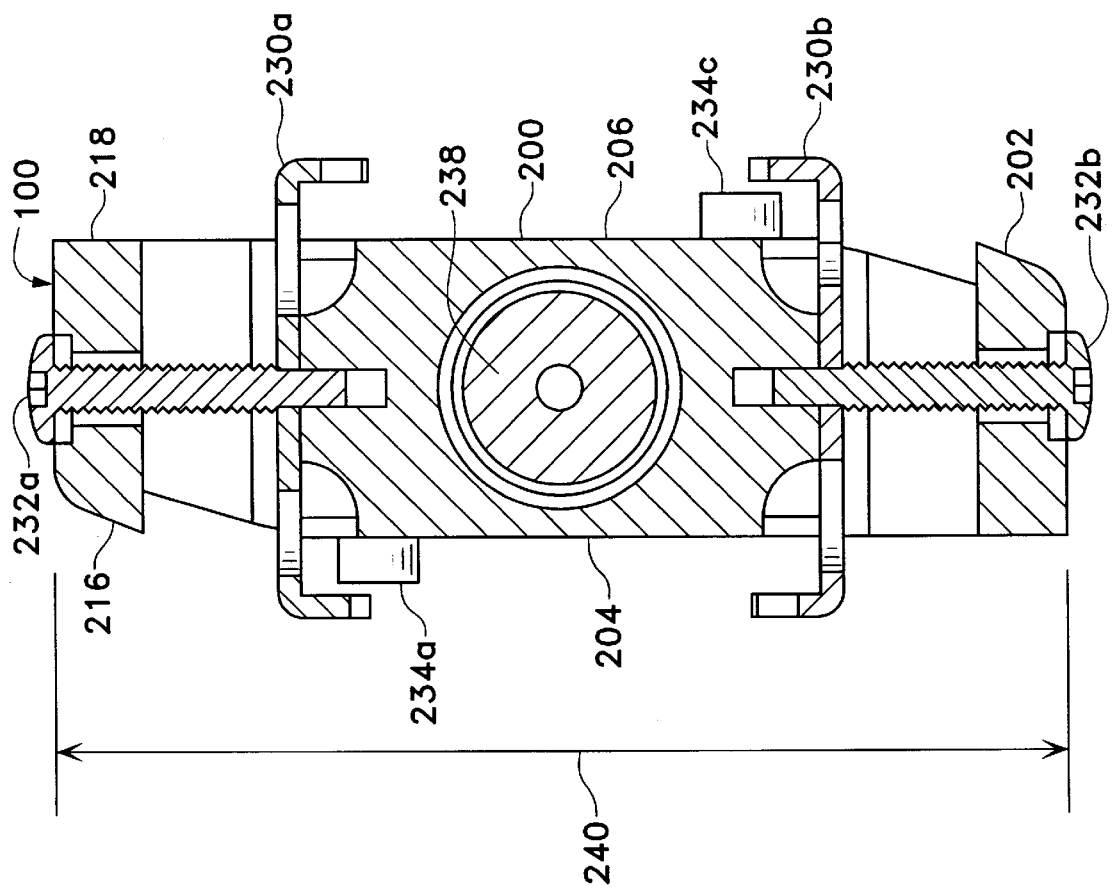

Continuing with FIGS. 2a and 3a, it may be seen that the present invention also includes four float limiting adjustment screws 234a through 234d. Adjustments screws 234 are inserted into threaded bores formed in the pedal platform 200. Importantly, when inserted in the threaded bores, each adjustments screw 234 is positioned to be adjacent to the forward end 400 of one of the cleat retainers 230. As a result, the forward end 400 of the cleat retainers 230 fully or partially overhangs the adjustments screws 234. The elevation of adjustment screws 234 relative to pedal platform 200 is adjustable by rotation of adjustment screws 234 within bores formed in pedal platform 200.

Figure 2B:
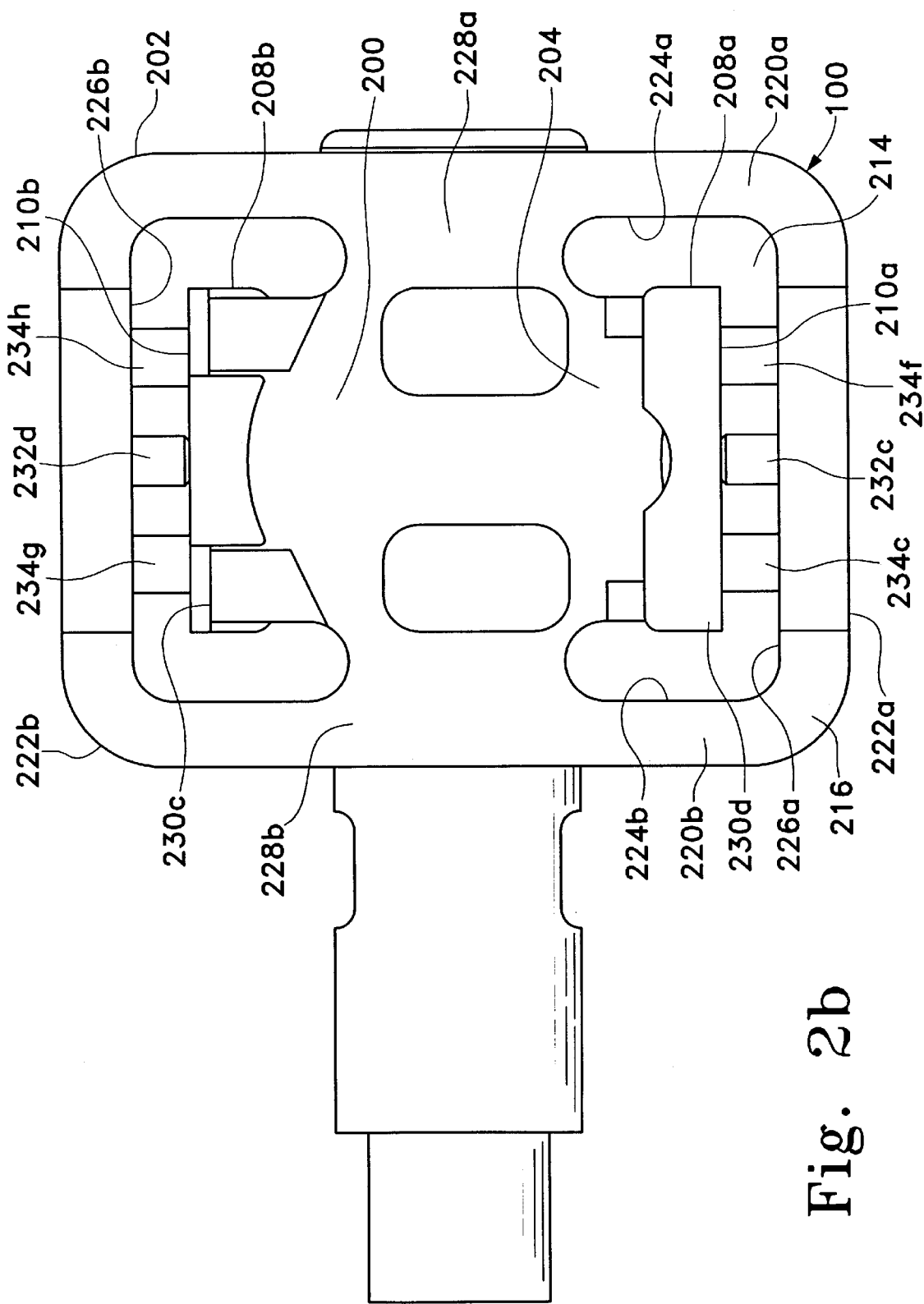
Figure 3B:
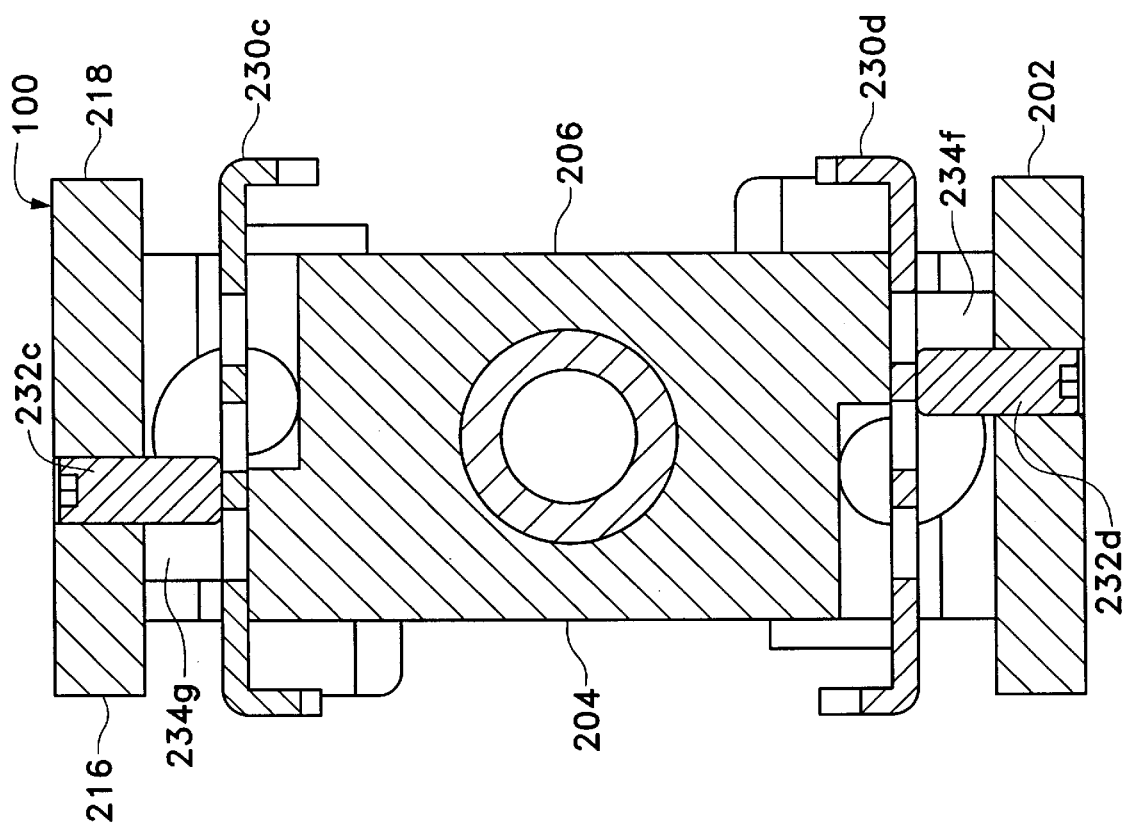
Figure 4A:
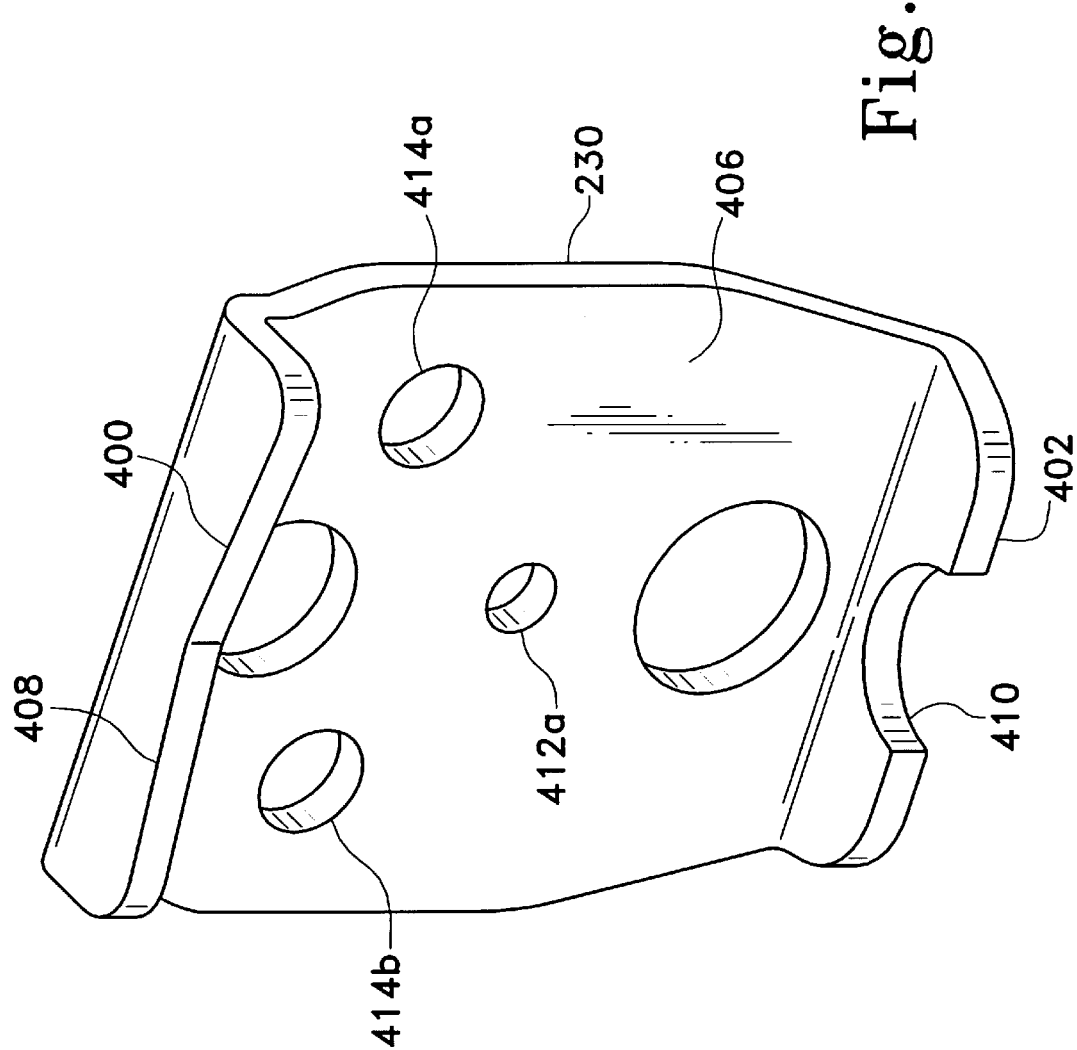

Corresponding to the float limiting function of adjustment screws 234a through 234d of the pedal of FIG. 1a, the pegs 234e through 234h seen in FIGS. 2b and 3b detailing the pedal of FIG. 1b control the orientation of cleat retainers 230 relative to the pedal platform 200. Pegs 234e and 234f pass through associated through-holes 412 in cleat retainer 230. As the pegs have a smaller outer diameter than the through holes 412 in cleat retainer 230. As the pegs 234 have a smaller outer diameter than the through-holes 412, each cleat retainer 230 may move with respect to platform 200 with the range of movement of cleat retainer being limited by pegs.

Naturally, the pedals of FIG. 1a and 1b merely provide illustrative embodiments. What is required of the float-limiting peg structures 234 in each pedal embodiment is that they constrain the range of movement of the cleat retainer relative to the pedal.

Figure 6:
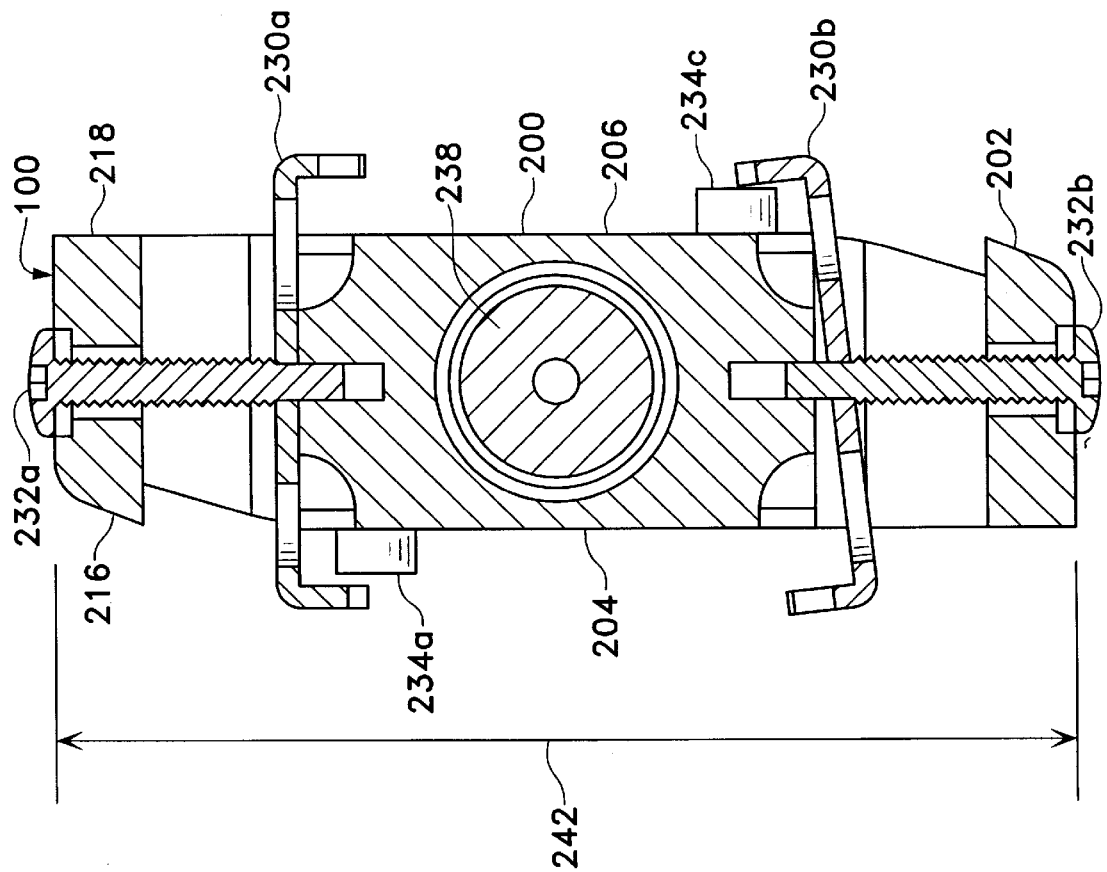

The cooperation between the pedal platform 200, cleat retainers 230, band 202 and set screws 232 allows each end 400 and 402 of each cleat retainer 230 to be pushed outwardly from the pedal platform 200 by elastic deformation of the band 202. This resilient movement may be better appreciated by comparison of FIGS. 3 and 6. More specifically, for purposes of illustration, the overall length of band 202 is shown as dimension 240 in FIG. 3a. In FIG. 6, however, it may be seen that the rearward end 402 of second cleat retainer 230b has been pivoted outwardly from pedal platform 200. This outward pivoting has resulted in an increase in the overall length of band 202 which is now shown as dimension 242. It may be appreciated that the change in the overall length of band 202 from dimension 240 to 242 has been accomplished by elastic deformation the band 202.

Figure 7:
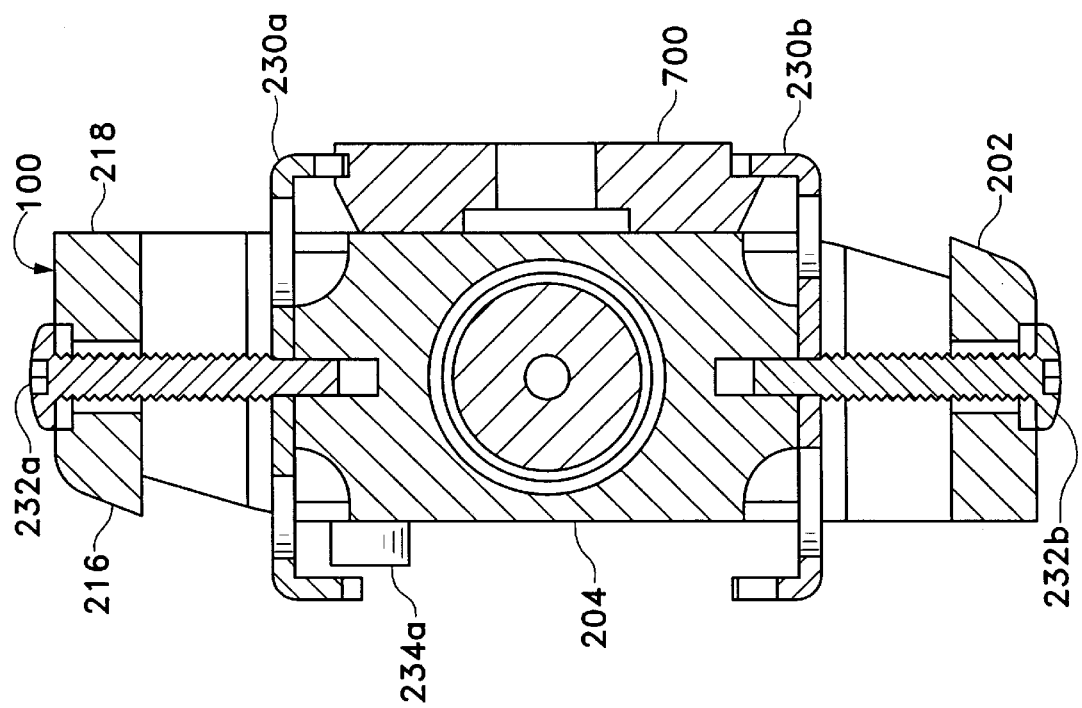

The outward pivoting motion of the cleat retainer 230 with respect to the pedal platform 200 allows a cleat, such as the well known SPD cleat, to be attached to pedal platform 200 by pressing a cleat toward the pedal platform 200. When the cleat contacts the cleat retainers 230, the cleat retainers are pushed outwardly to pivot away from pedal platform 200. Subsequently, as the cleat passes pedal retainers 230, the cleat retainers 230 are allowed to regain their position. As cleat retainers 230 regain their original position, the cleat will be positioned between ends 400, 402 and pedal platform 200. For purposes of illustration, FIG. 7 shows an exemplary SPD cleat 700 retained between ends 400, 402 and pedal platform 200.

As discussed above and shown in FIG. 7, cleat retainers 230 return to their position against pedal platform 200 subsequent to insertion of cleat 700. Alternatively, by proper dimensioning of ends 400, 402 and pedal platform 200, end 400 or end 402 may be caused to remain partially extended from pedal platform 200 after insertion of cleat 700. In this alternative, cleat 700 is retained under tension between pedal retainers 230 as well as between ends 400, 402 and pedal platform 200.

It should also be noted that the resilient movement of end 400 and 402 of cleat retainers 230 may be accomplished, in whole or in part, by elastic deformation of the cleat retainers 230. Stated simply, cleat retainers 230 may be made to resiliently flex, or bend, away from the pedal platform 200. This bending may be provided in addition to the movement provided by the elastic deformation of the band 202. Alternately, by appropriate selection of materials, the bending of the cleat retainers 230 may be made to substantially replace the elastic deformation of the band 202.

Figure 8A:
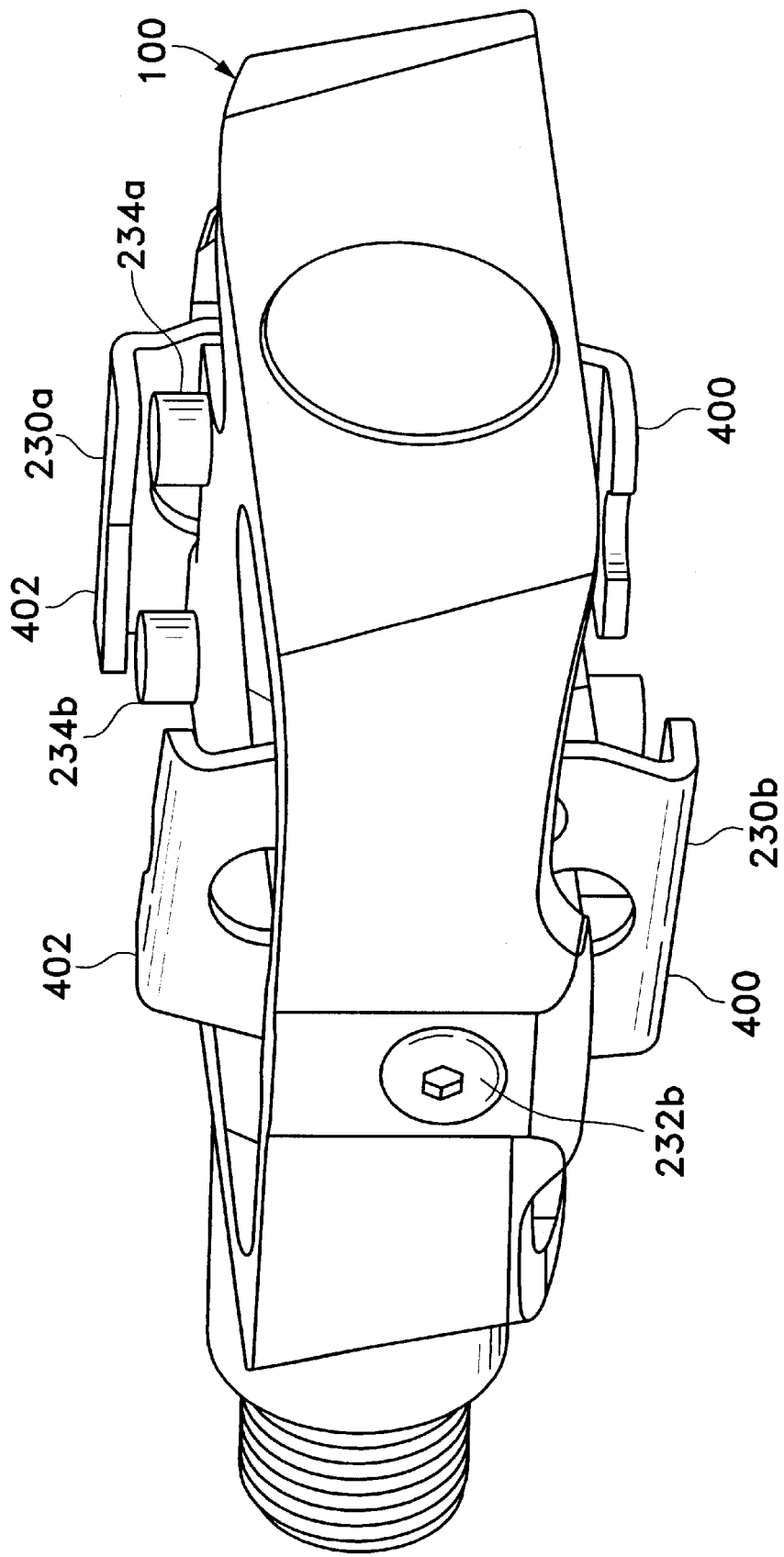
Figure 8B:
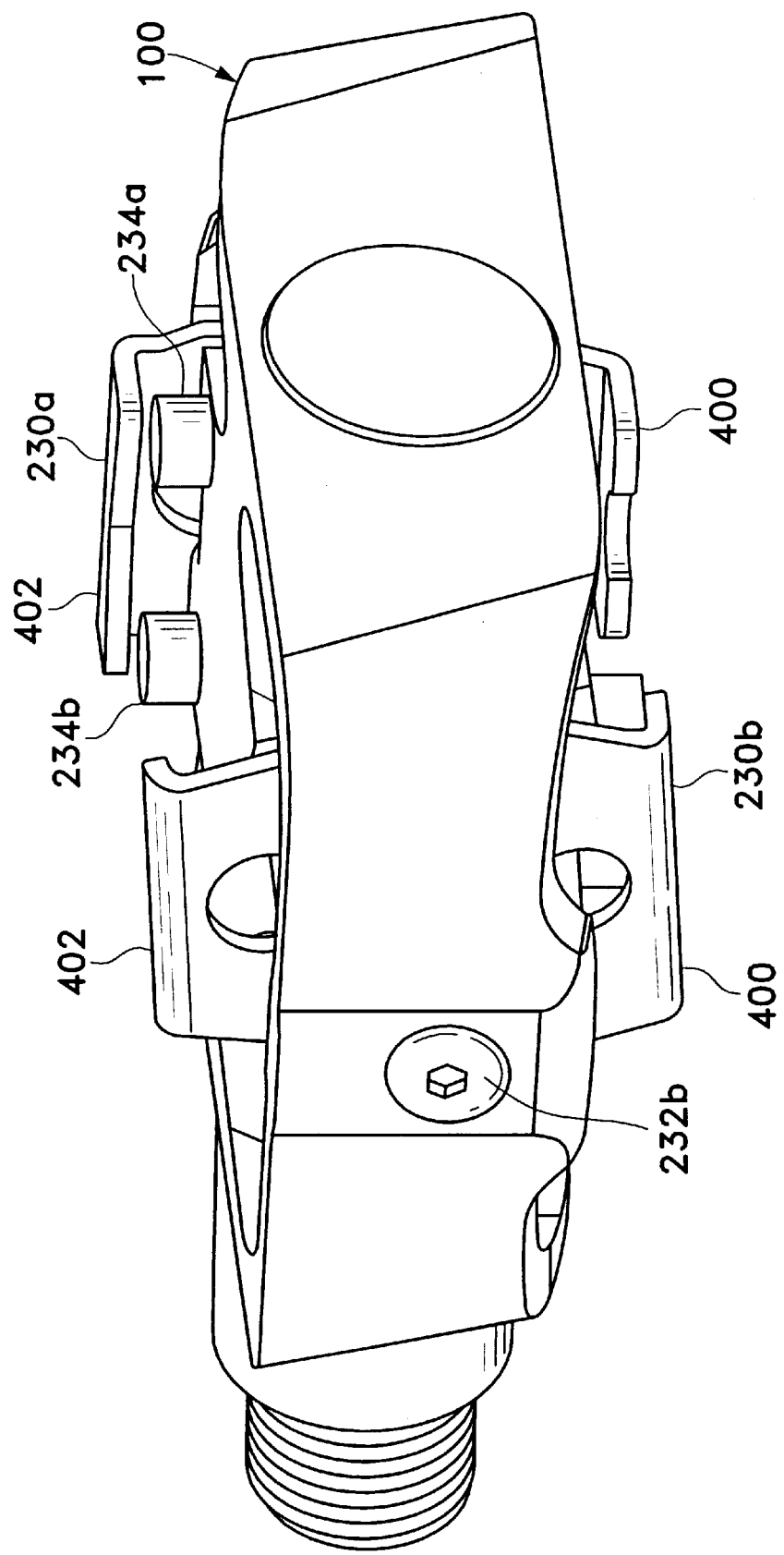
Figure 9B:
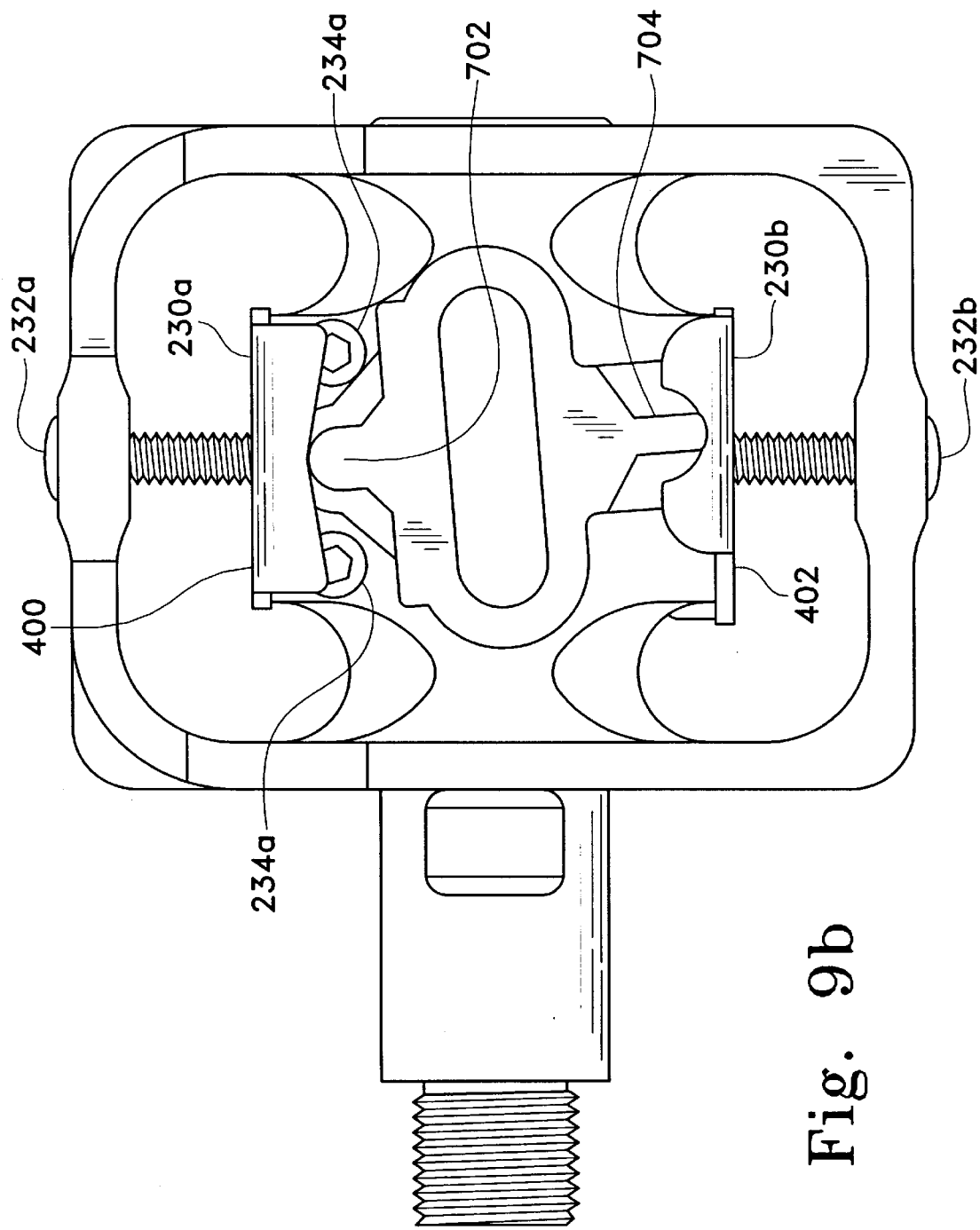
Figure 9C:
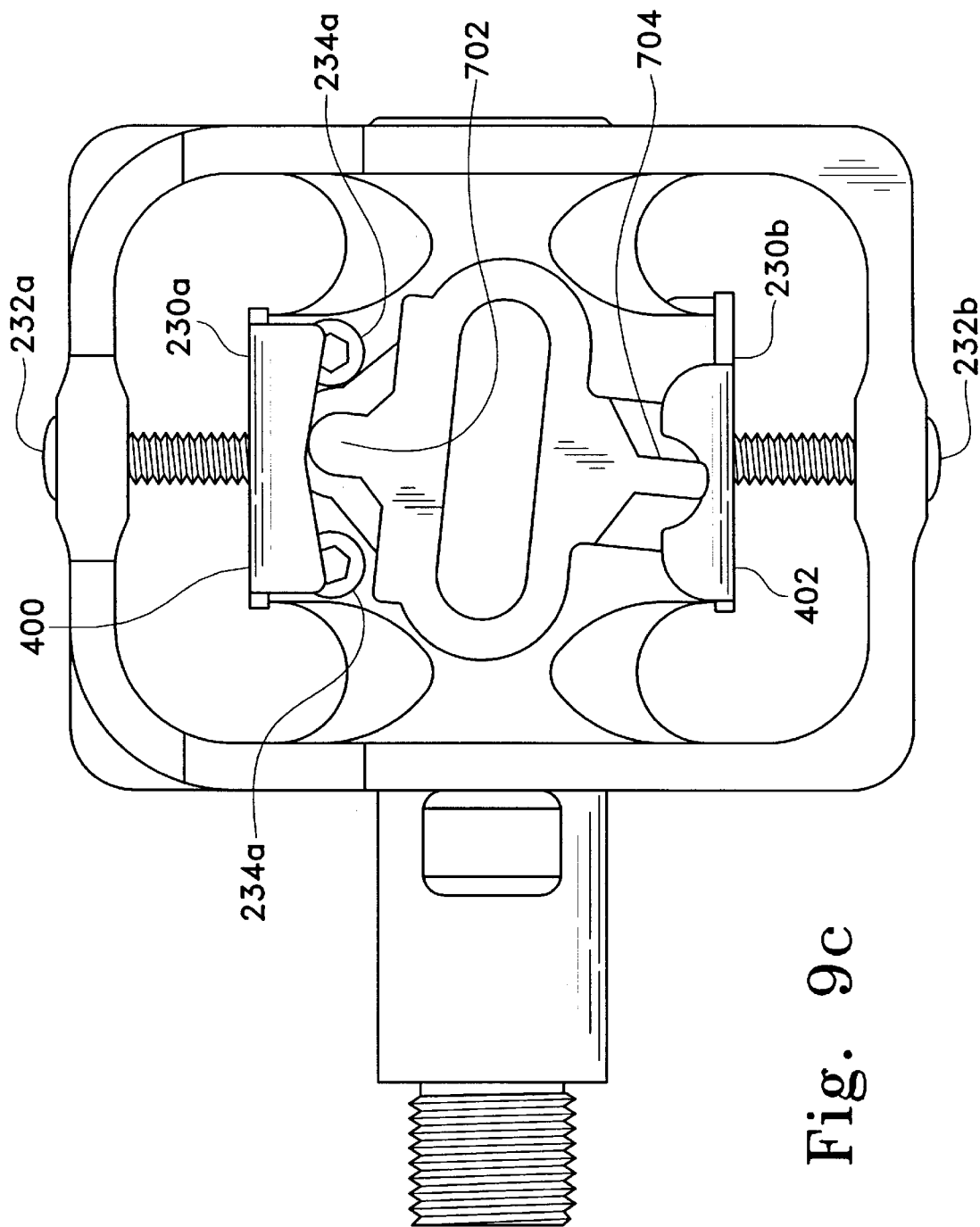

The cooperation between the pedal platform 200, cleat retainers 230, band 202 and set screws 232 also allows each cleat retainer 230 to pivot about an axis defined by set screws 232. This movement may be better appreciated by reference to FIGS. 8a and 8b. In FIG. 8a, it may be seen that cleat retainer 230 has pivoted around set screw 232 to bring forward end 400 of cleat retainer 230 into contact with adjustment screw 234a. By way of comparison, in FIG. 8b, it may be seen that cleat retainer 230 has pivoted in the opposite direction around set screw 232 to bring forward end 400 of cleat retainer 230 into contact with adjustment screw 234b. Thus, it may be appreciated that cleat retainer 230 is free to pivot around set screw 232 with the range of rotation being controlled by alternate contact of forward end 400 with adjustment screws 234a and 234b. As a result, by choosing the elevation of adjustment screws 234a and 234b with respect to pedal platform 200, the range of motion available to cleat retainer 230 may be selectively controlled. It should be appreciated that the elevation of each adjustment screw 234 is individually selectable. Therefore, the range of motion available to first cleat retainer 230a may differ from the range of motion available to second cleat retainer 230b. Each cleat retainer 230 may also be configured to pivot more freely in the direction shown in FIG. 8a, or in the direction shown in FIG. 8b. Effectively, the pivoting movement of the cleat retainer 230 allows the rearward end 402 of cleat retainer 230 to move laterally with respect to pedal platform 200.

The ability of rearward end 402 of cleat retainer 230 to move laterally with respect to pedal platform 200 allows a cleat, such as the Shimano SPD type cleat, to float when attached to pedal assembly 100. More specifically, in FIG. 9a, it may be seen that a Shimano SPD type cleat 700 has been inserted into pedal assembly 100. Cleat 700 has a forward protrusion 702 that is positioned between adjustment screw 234a and adjustment screw 234a. Cleat 700 also has a rearward projection 704 that is shown positioned in notch 410 of rearward end 402 of cleat retainer 230. The pivoting motion of cleat retainer 230 around set screw 234 allows cleat 700 to rotate, twist or float with respect to pedal assembly 100. This may be seen more clearly in FIG. 9b where cleat retainer 230 has pivoted around set screw 232 to allow cleat retainer to float in a first direction. It may also be seen in FIG. 9c where cleat retainer 230 has pivoted around set screw 232 to allow cleat retainer to float in a second, opposite, direction. Importantly, by adjustment of the elevation of adjustment screws 234, the ability of cleat 700 to float in either direction may be selectively controlled. It should also be appreciated that while the embodiment shown in the Figures floats by rotation of one cleat retainer 230 at a time, the present invention specifically includes pedal systems where both cleat retainers pivot during cleat flotation. The cooperation of structure that provides for cleat float by rotation of one or more cleat retainers is also specifically intended to be useable in combination with pedal systems that provide for cleat insertion by means other than the elastic deformation of band 202.

As discussed, the cooperation between the pedal platform 200, cleat retainers 230, band 202 and set screws 232 provides a structure which allows the cleat retainers 230 to pivot to allow for cleat insertion. This cooperation also provides a structure which allows the cleat retainers 230 to pivot to allow for cleat flotation. Other structural combinations, which provide the same combination of cleat insertion and cleat floatation may be used without departing from the spirit of the present invention.

Importantly, the features of the pedal assembly 100 discussed thus far are arranged as symmetrical mirror images with respect to upper surface 204 and lower surface 206 of the pedal platform 200. Thus, exemplary SPD cleat 700 may be attached to the pedal platform 200 at either upper surface 204 or lower surface 206. Additionally, the features of the pedal assembly 100 discussed thus far are arranged symmetrically with respect to centerline 236 which bisects the pedal platform 200 between major sides 208. In this way, the components of the pedal discussed thus far (i.e. pedal platform 200, band 202, cleat retainers 230, and set screws 232) may be used to fabricate a single assembly which may be used for both right and left pedals.

Figure 10:
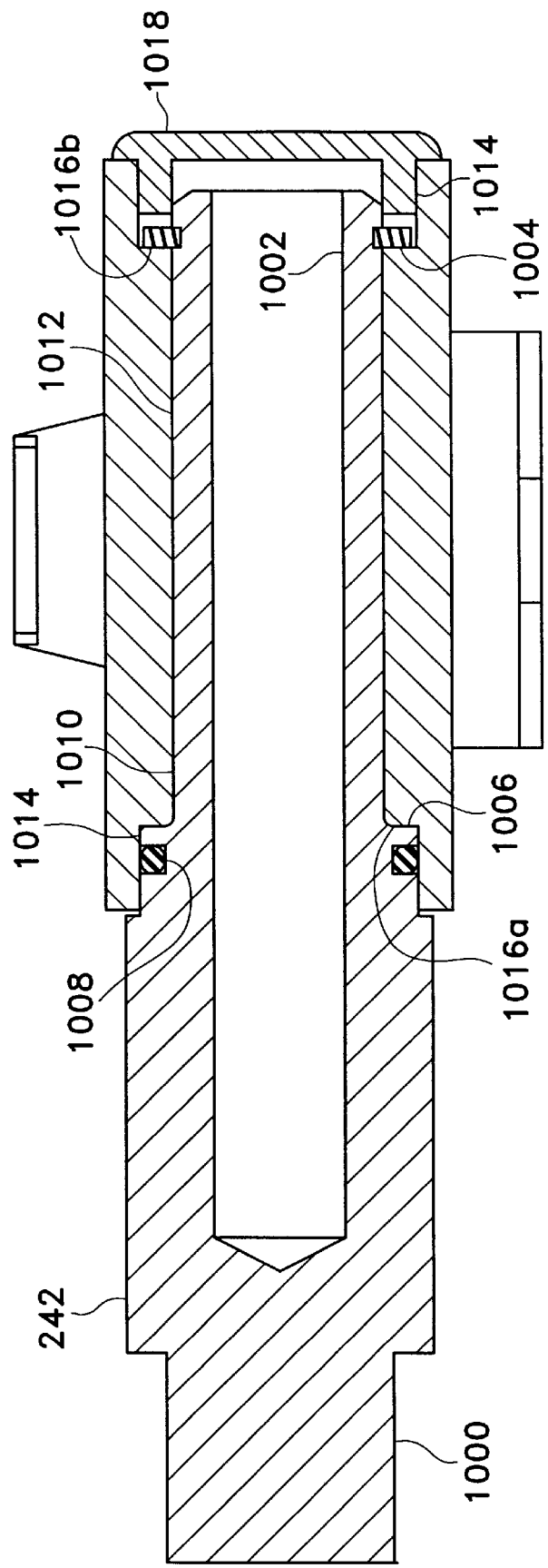

Referring again to FIGS. 2 and 3, it may be seen that pedal assembly 100 includes an axle 238. The axle 238, better seen in FIG. 10, is preferable formed from a lightweight alloy, such as aluminum or magnesium, and treated by anodizing or chrome plating to have a hard, wear resistant surface. Alternately, a separate steel sleeve may be press fitted to cover portions of axle 238 to form the wear resistant surface (not shown). Preferably, the axle 238 is formed to be substantially hollow.

The axle 238 has an inboard end 1000 which is preferably threaded with 9/16 inch by 20 threads per inch thread size to be compatible with standard bicycle cranksets. The axle 238 also has an outboard end 1002 adapted to receive a circlip 1004 or other retaining means. The outboard end 1004 also has a diameter which is smaller than the diameter of the inboard end 1000. The change in diameter between the outboard end 1004 and inboard end 1000 creates an annular thrust surface 1006 between the inboard end 1000 and outboard end 1002 of the axle 238. An O-ring 1008, or other seal, is positioned adjacently to and inboard from the thrust surface 1006.

The pedal platform 200 and band 202 are formed to include a bore 1010 passing between the major sides 220 of the band 202. The bore 1010 has a narrow inner section 1012 surrounded by two identical outer sections 1014. Separating the outer sections 1014 and the inner section 1012 are two shoulders 1016a and 1016b. The bore 1010 is shaped to receive the axle 238 with the thrust surface 1006 positioned against one of the shoulders 1016 and the circlip 1004 positioned against the opposite shoulder 1016. Preferably, the bore 1010 and axle 238 are formed to allow the axle 238 to be inserted into either end of the bore 208, allowing a single assembly, including platform 200, band 202, cleat retainers 230, and set screws 232, to be used for both right and left pedals. A cap 1018 is positioned in the outboard outer section 1014 of the bore 1010.

In a presently preferred embodiment, the material used to form the pedal platform 200 and band 202 (and thus the bore 1010) is impregnated with a lubricant such as molybdenum disulfide, graphite, TEFLON or oil. This allows the axle 238 to turn in the bore 1010 without specialized bearings. In cases where the pedal assembly 100 is intended to be reconditioned, it may be advantageous to include removable bearing liners (not shown) within the bore 1010. This allows used bearing liners to be replaced with new bearings liners as part of the reconditioning process. In other cases, non-plain bearings or such as ball bearings, roller bearings, may be used to support axle 238 in bore 1010. In still other cases, combinations of ball, roller, and plain bearings may be used to support axle 238 in bore 1010.

It should be appreciated that the embodiment of the pedal system 100 described in the preceding paragraphs is intended to be representative in nature. More specifically, it should be appreciated that the present invention is adaptable to various alternate embodiments. For example, the pedal system is specifically adaptable to non-SPD systems, such as Look compatible systems or other types. Further, the pedal system of the present invention, may be configured to be equally well suited to pedals which have a single surface for cleat attachment. Additionally, the present invention may also be adapted to cleat systems which require, more, or fewer, moving cleat retainers. There are, of course, numerous other embodiments which do not depart from the spirit of the present invention.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A clipless pedal for a bicycle, the pedal comprising:
   (a) a pedal platform positioned within a band, the pedal platform having two surfaces and two minor sides;
   (b) two cleat retainers having a central portion, the central portion of each cleat retainer positioned against a minor side of the pedal platform; and
   (c) two stops having a longitudinal axis, each stop forming a fixed point of contact with respect to a cleat retainer and with respect to the band and separably holding a portion of a cleat retainer in position against the pedal platform, each stop allowing a cleat retainer to pivot outwardly with respect to a minor side of the pedal platform.

2. The pedal of claim 1 where the stops allow the cleat retainers to pivot by elastic deformation of the band.

3. The pedal of claim 1 where the cleat retainer is adapted to be elastically deformed.

4. The pedal of claim 1 where the peal platform and band are fabricated as a unitary assembly.

5. The pedal of claim 1 further comprising an axle which turns in a bore formed in the pedal platform.

6. The pedal of claim 5 where the pedal platform is impregnated with a lubricant and where the axle turns in the bore without bearings.

7. The pedal of claim 5 where the axle is impregnated with a lubricant and where the axle turns in the bore without bearings.

8. The pedal of claim 5 where the axle is formed from an alloy selected from the group of magnesium and aluminum.

9. The pedal of claim 5 where the axle is hard coated by anodizing or chrome plating.

10. The pedal of claim 1 where at least one cleat retainer is rotatable about a stop longitudinal axis, the pedal additionally comprising at least one limiter element being adapted to limit cleat retainer rotation.

11. The pedal of claim 10 where at least one limiter element comprises a screw perpendicular to a surface of the pedal.

12. The pedal of claim 11 where at least one limiter is adjustable so that a varying degree of rotation of the cleat retainer may be selectively controlled.

13. The pedal of claim 10 where at least one limiter comprises a peg perpendicular to a minor side of the pedal.

14. The pedal of claim 1 where at least one stop is adjustable along its longitudinal axis.

15. The pedal of claim 1 where at least one cleat retainer additionally comprises at least one hooked end and a notched forward end.

16. The pedal of claim 1 where at least one cleat retainer additionally comprises at least one hooked end and a notched rearward end.

17. The pedal of claim 1 where the band and the pedal platform are plastic.

18. The pedal of claim 17 where the plastic is a thermoplastic.

19. A clipless pedal for a bicycle, the pedal comprising:
(a) a pedal platform positioned within a band, the pedal platform having two surfaces and two minor sides;
(b) two cleat retainers having a central portion, the central portion of each cleat retainer separably positioned against a minor side of the pedal platform;
(c) two stops having a longitudinal axis, each stop forming a point of contact with respect to a cleat retainer and with respect the band; and
(d) at least one limiter element interfacing with each retainer, the limiter elements being adapted to limit cleat retainer rotation.

20. The pedal of claim 19 where each stop allows the cleat retainer to pivot by elastic deformation of the band.

21. The pedal of claim 19 where the cleat retainer is adapted to be elastically deformed.

22. The pedal of claim 19 where the stop allows the cleat retainer to pivot by elastic deformation of the band and the cleat retainer is adapted to be elastically deformed.

23. The pedal of claim 19 where at least one limiter element comprises a screw perpendicular to a surface of the pedal.

24. The pedal of claim 23 where at least one limiter is adjustable so that a varying degree of rotation of the cleat retainer may be selectively controlled.

25. The pedal of claim 19 where at least one limiter comprises a peg perpendicular to a minor side of the pedal.

26. A clipless pedal for a bicycle, the pedal comprising:
(a) a pedal platform having two surfaces and two minor sides;
(b) two band segments, at least a portion of each being positioned opposite a pedal platform minor side;
(c) two cleat retainers, each having a central portion separably positioned against the minor side of the pedal platform; and
(d) two stops, each stop positioned between a band segment and a cleat retainer and providing a point of contact with the cleat retainer.

27. The pedal of claim 26 additionally comprising at least one limiter element interfacing with a cleat retainer and adapted to limit rotation of the cleat retainer.

28. The pedal of claim 26 further comprising at least one hooked end on each cleat retainer.

\* \* \* \* \*